United States Patent
Li et al.

(10) Patent No.: US 11,808,019 B2
(45) Date of Patent: Nov. 7, 2023

(54) UNIVERSAL ROUGH-IN VALVE AND MANIFOLD

(71) Applicant: AS America, Inc., Piscataway, NJ (US)

(72) Inventors: Hsiao Chang Li, Edison, NJ (US); Walter Pitsch, Washington, NJ (US)

(73) Assignee: AS America, Inc., Piscataway, NJ (US)

( * ) Notice: Subject to any disclaimer, the term of this patent is extended or adjusted under 35 U.S.C. 154(b) by 106 days.

(21) Appl. No.: 17/602,185

(22) PCT Filed: Apr. 10, 2020

(86) PCT No.: PCT/US2020/027641
§ 371 (c)(1),
(2) Date: Oct. 7, 2021

(87) PCT Pub. No.: WO2020/210606
PCT Pub. Date: Oct. 15, 2020

(65) Prior Publication Data
US 2022/0145597 A1 May 12, 2022

Related U.S. Application Data (60) Provisional application No. 62/832,591, filed on Apr. 11, 2019.

(51) Int. Cl.
*E03C 1/02* (2006.01)
*E03C 1/042* (2006.01)
(Continued)

(52) U.S. Cl.
CPC .............. *E03C 1/021* (2013.01); *E03C 1/042* (2013.01); *F16K 11/0853* (2013.01); *F16K 27/003* (2013.01)

(58) Field of Classification Search
CPC .... E03C 1/021; F16K 11/074; F16K 11/1782; F16K 19/006; Y10T 137/6011; Y10T 137/87249
See application file for complete search history.

(56) References Cited

U.S. PATENT DOCUMENTS

| | | | |
|---|---|---|---|
| 7,100,630 B2* | 9/2006 | Vu ...................... | F16K 11/0743 137/98 |
| 2007/0056639 A1* | 3/2007 | McNerney ............ | E03C 1/0408 137/597 |

(Continued)

OTHER PUBLICATIONS

International Search Report dated Aug. 12, 2020 in corresponding International Application No. PCT/US2020/027641(2 pages).

*Primary Examiner* — Reinaldo Sanchez-Medina
(74) *Attorney, Agent, or Firm* — Tyler A. Stevenson; Anna-Lisa L. Gallo (57) ABSTRACT

A valve manifold for a universal rough-in valve, the manifold comprising a first inlet; a second inlet; a first outlet; a second outlet; a cavity to receive a fluid mixing valve; a first transition in flow communication with the cavity and the first inlet; a second transition in flow communication with the cavity and the second inlet; a first channel in flow communication with the cavity and the first outlet; a second channel in flow communication with the cavity and the second outlet; wherein the manifold comprises a venturi tube extending from the second manifold outlet towards the first manifold outlet; and wherein the manifold is configured to be removably disposed in a rough-in valve chamber; and the manifold is configured to be removably coupled to the fluid mixing valve.

20 Claims, 9 Drawing Sheets

(51) Int. Cl.
  *F16K 11/085* (2006.01)
  *F16K 27/00* (2006.01)

(56) References Cited

U.S. PATENT DOCUMENTS

| | | |
|---|---|---|
| 2010/0212759 A1 | 8/2010 | Devries et al. |
| 2014/0150906 A1 | 6/2014 | Shaffer et al. |
| 2014/0261779 A1 | 9/2014 | Niver |
| 2014/0261808 A1* | 9/2014 | Brouwer .............. F16K 39/024 251/366 |
| 2017/0211711 A1 | 7/2017 | Ritter et al. |
| 2018/0080567 A1 | 3/2018 | Hampton et al. |

* cited by examiner

UNIVERSAL ROUGH-IN VALVE AND MANIFOLD

The disclosure is directed to a rough-in valve and a valve manifold configured to be removably disposed in the rough-in valve. The manifold is configured to removably receive a fluid mixing valve.

BACKGROUND

Large projects including hotels, apartment buildings, and the like may conveniently be designed for bathrooms and for bathroom fixtures to be positioned back-to-back. This provides economy regarding pipes for plumbing fixtures, electrical service, etc. Having an easy-to-install universal rough-in valve would provide great time savings for plumbers. For example, a rough-in valve that may be placed back-to-back to service back-to-back tub/shower combinations would be highly desired.

A valve adapted to deliver water to a tub/shower combination may comprise a non-symmetrical fluid outlet pathway to the tub or shower. As a rough-in valve is rotated about a Y axis to be placed back-to-back with another rough-in valve, a non-symmetrical outlet pathway along a Y axis will be preserved. However, hot/cold water inlets of a fluid mixing valve will be reversed.

Desired is a valve manifold for a universal rough-in valve, wherein the manifold is configured to receive a fluid mixing valve, and wherein a position of the fluid mixing valve may be adjusted relative to the manifold. This may allow a rough-in valve and manifold to be rotated about 180 degrees about a Y axis to be placed back-to-back with another rough-in valve/manifold and for both to receive hot water from the same side and to receive cold water from the same side. A valve manifold having a removably coupled fluid mixing valve may accomplish this.

SUMMARY

Accordingly, disclosed is a valve manifold for a universal rough-in valve, the manifold comprising a first manifold inlet; a second manifold inlet; a first manifold outlet; a second manifold outlet; a cavity configured to receive a fluid mixing valve; a first transition in flow communication with the cavity and the first manifold inlet; a second transition in flow communication with the cavity and the second manifold inlet; a first channel in flow communication with the cavity and the first manifold outlet; a second channel in flow communication with the cavity and the second manifold outlet; wherein the manifold comprises a venturi tube comprising a first section and a second section; the venturi tube first section has a larger cross-sectional area than the second section; the venturi tube first section is disposed in the second manifold outlet; and the venturi tube extends from the second manifold outlet towards the first manifold outlet; and wherein the manifold is configured to be removably disposed in a rough-in valve chamber; and the manifold is configured to be removably coupled to the fluid mixing valve.

Also disclosed is a universal rough-in valve comprising a valve chamber configured to receive a valve manifold; a first valve inlet configured to be in flow communication with a first fluid supply source; a second valve inlet configured to be in flow communication with a second fluid supply source; a first valve outlet configured to be in flow communication with the valve chamber and a first outlet line; a second valve outlet configured to be in flow communication with the valve chamber and a second outlet line; and present valve manifold removably disposed in the chamber.

Also disclosed is a fluid mixing valve comprising a mixing cartridge; a first fluid mixing valve inlet; a second fluid mixing valve inlet; a first fluid mixing valve outlet; and a second fluid mixing valve outlet; wherein the fluid mixing valve is configured to be removably coupled to a present valve manifold at about 180 degree rotation intervals of the fluid mixing valve relative to the manifold.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DISCLOSURE

A rough-in valve is a valve used in plumbing systems to connect one or more fluid inlets to one or more fluid outlets. It would be highly convenient for plumbers to be able to place rough-in valves back-to-back in adjacent bathrooms in large projects like hotels, etc., and to have the valves be able to accept hot water from the same side and cold water from the same side.

In an embodiment of the disclosure, a rough-in valve comprises a manifold/fluid mixing valve assembly. A fluid mixing valve may be for instance a pressure balance valve or a thermostatic valve. A fluid mixing valve may comprise an adjustable limiter, designed to limit an amount (e.g. percentage) of hot water allowed to flow through the valve. The fluid mixing valve may have an inlet dedicated for hot water and an inlet dedicated for cold water.

In an embodiment, the valve manifold comprises first and second inlets and first and second outlets. The manifold inlets are in flow communication with the fluid mixing valve inlets via manifold transitions. In an embodiment, the manifold outlets comprise a passageway extending from the first outlet to the second outlet. In an embodiment, a manifold outlet passageway may contain a venturi tube. A venturi tube ("venturi") may have a first section and a second section, wherein the first section has a larger cross-sectional area than the second section. In some embodiments, a venturi first section may have a substantially frustoconical shape. In some embodiments, a venturi second section may have a substantially rectangular cross-sectional shape.

In some embodiments, a venturi first section is disposed in a manifold second outlet. In certain embodiments, the venturi first section may be permanently disposed in a manifold outlet. In some embodiments, a venturi first section outer surface may form a seal with a manifold outlet inner surface. In an embodiment, the venturi tube may comprise an attachment element configured to permanently fix it in the second manifold outlet. In an embodiment, a venturi may be permanently fixed in a manifold outlet via a one or more tab/notch elements. In a certain embodiment, a venturi may comprise one or more "locking tabs" on an exterior surface of the first section. Upon insertion of a venturi into an outlet pathway, one or more locking tabs positioned on an exterior of the venturi first section may be forced into the outlet pathway and lock in a space or notch on a manifold interior.

In certain embodiments, a check valve may be installed in a first manifold inlet and/or in a second manifold inlet. A check valve may prevent "cross-talk" between hot and cold water sources that may occur due to pressure differences.

In some embodiments, a manifold is configured to be disposed in a rough-in valve in a fixed position. A manifold fixed position may provide that a venturi first section is pointing "down" along the Y axis. In some embodiments, a venturi first section will point down along the Y axis towards a tub supply line and to a tub spout. In some embodiments, a venturi second section will point "up" along the Y axis towards a shower supply line to a shower head.

Thus, in order to place two rough-in valves back-to-back, a total valve assembly may be rotated around the Y axis to preserve the venturi position. To place the hot/cold water fluid mixing valve inlets in the correct position, the fluid mixing valve may be removed from the manifold, rotated about 180 degrees and re-inserted in the manifold. The back-to-back rough-in valves may now accept hot water from the same side and cold water from the same side.

In certain embodiments, a fluid mixing valve is configured to be inserted into a manifold cavity. A manifold cavity may have a sidewall defining the cavity. A manifold sidewall and/or a fluid mixing valve may comprise certain features designed to provide for reversible attachment of the manifold and fluid mixing valve. For example, certain attachment features may comprise a notch/tab element, a pin/slot element, a pin/hole element, threaded elements, etc. In a certain embodiment, an attachment feature comprises a substantially U-shaped pin and slot element.

In some embodiments, a manifold may contain one or more retainer features to hold an attachment element in place after assembly, and thereby hold a manifold/fluid mixing valve assembly together. The retainer features may be one or more of notches, tabs, grooves, dimples, etc. A manifold may comprise a plurality of retainer features.

In some embodiments, an exterior of the manifold may comprise one or more grooves configured to receive one or more gaskets. The gaskets may be configured to form a seal with an interior chamber surface of a rough-in valve. In a certain embodiment, a gasket may comprise ring shaped sections connected via strut sections.

In certain embodiments, a valve manifold cavity may comprise a shape configured to couple to a fluid mixing valve shape, so as to only allow proper positioning of the fluid mixing valve at about 180 degree rotation intervals relative to the manifold.

In some embodiments, the valve manifold comprises transitions in flow communication with the manifold inlets. The transitions may be transverse to the manifold inlets and may be positioned towards a center of the manifold. The transitions are configured to be in flow communication with fluid mixing valve inlets. The manifold comprises outlets in flow communication with fluid mixing valve outlets via manifold channels. Manifold channels may be positioned towards an outer section of the manifold, for instance towards a sidewall.

In some embodiments, a manifold comprising a venturi may be substantially symmetrical about a plane bisecting the outlets and venturi.

In some embodiments, a length of the rough-in valve from inlet to inlet is from any of about 100 mm, about 105 mm, about 110 mm, about 120 mm, or about 130 mm to any of about 140 mm, about 150 mm, about 155 mm, about 160 mm, about 170 mm, about 180 mm or more.

In some embodiments, a height of the rough-in valve from outlet to outlet is from any of about 85 mm, about 90 mm, about 95 mm, about 100 mm, or about 105 mm to any of about 110 mm, about 115 mm, about 120 mm, about 125 mm, about 130 mm, about 135 mm or more.

Figure 1:
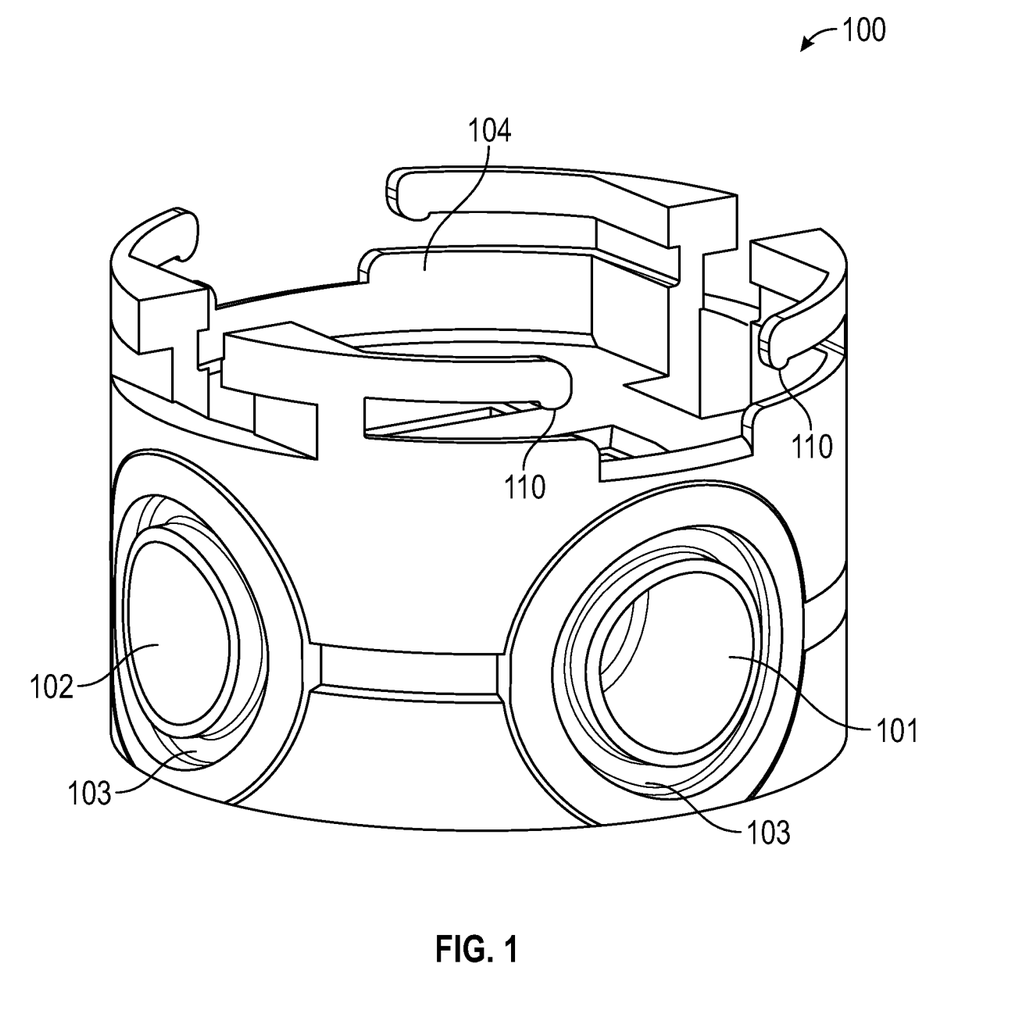
FIG. 1 depicts a valve manifold according to an embodiment.

FIG. 1 shows valve manifold 100 according to an embodiment. Visible are manifold inlet 101 and manifold outlet 102. The outlets and inlets comprise grooves 103 configured to receive a gasket configured to form a seal with an interior wall of a rough-in valve chamber. The manifold comprises sidewall 104 which defines a cavity configured to receive a fluid mixing valve. An upper section of manifold 100 comprises a plurality of retainer features 110 that hold an attachment element in place (see FIG. 3C).

Figure 2A:
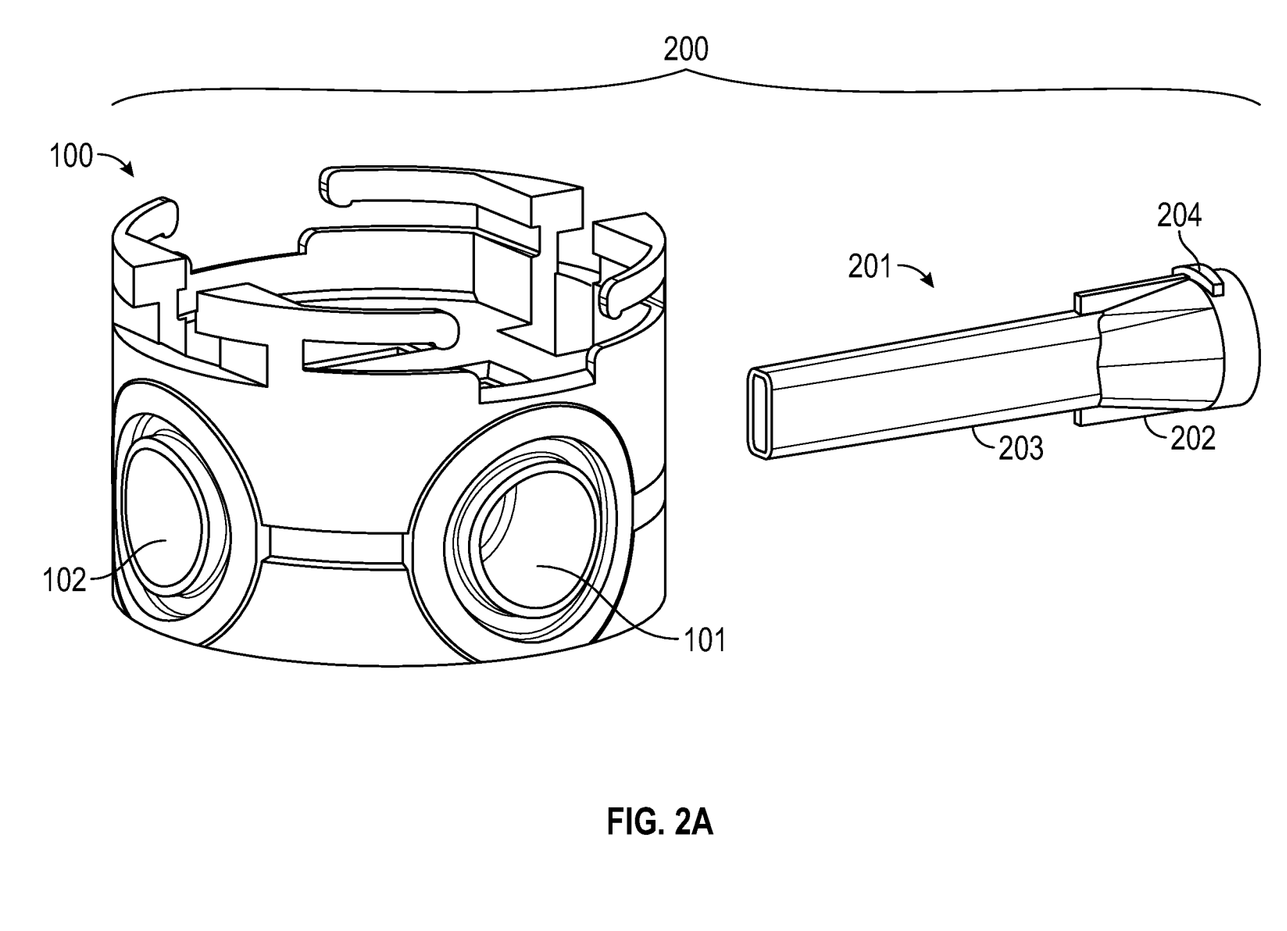
FIG. 2A depicts a valve manifold and a venturi tube separated, according to an embodiment.

FIG. 2A depicts assembly 200, comprising manifold 100 and venturi tube 201 separated, according to an embodiment. The venturi tube comprises cone-shaped first section 202 and rectangle-shaped second section 203. First section 202 has a larger cross-sectional area than the second section 203. Second section 203 is facing a second manifold outlet (not visible), and when inserted into the second manifold outlet, the venturi will extend from the second manifold outlet to first manifold outlet 102. Locking tab 204 is seen on an exterior surface of venturi first section 202.

Figure 2B:
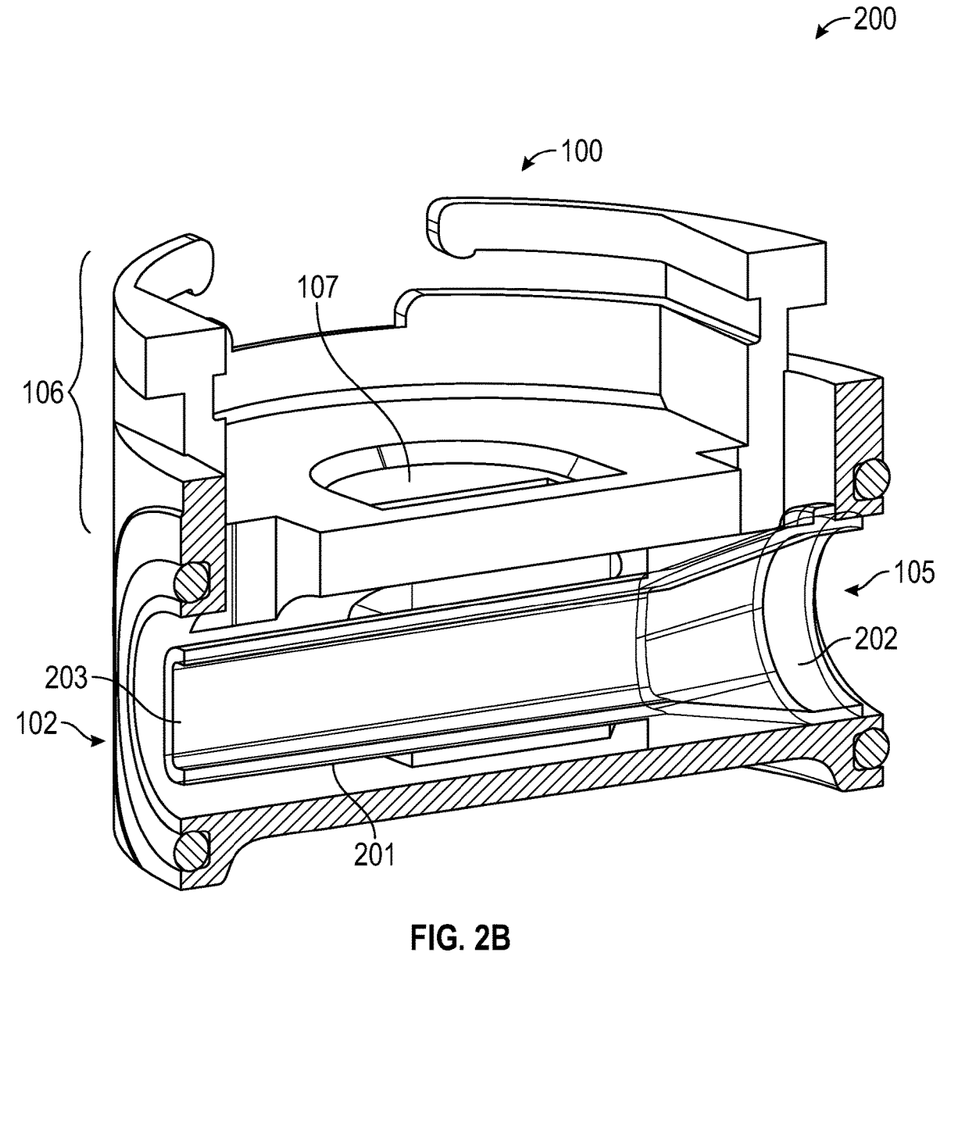
FIG. 2B shows a cross-section view of a valve manifold/venturi assembly according to an embodiment.

FIG. 2B shows a cross-section view of valve manifold 100 comprising venturi 201 assembly 200 according to an embodiment. Venturi tube first section 202 is disposed in second manifold outlet 105. Venturi 201 extends from second manifold outlet 105 towards first manifold outlet 102. Venturi 201 may be permanently fixed in manifold outlet 105. Visible is manifold cavity 106 configured to receive a fluid mixing valve. Also visible is transition 107 which is in flow communication with cavity 106 and a manifold inlet (not visible).

Figure 3A:
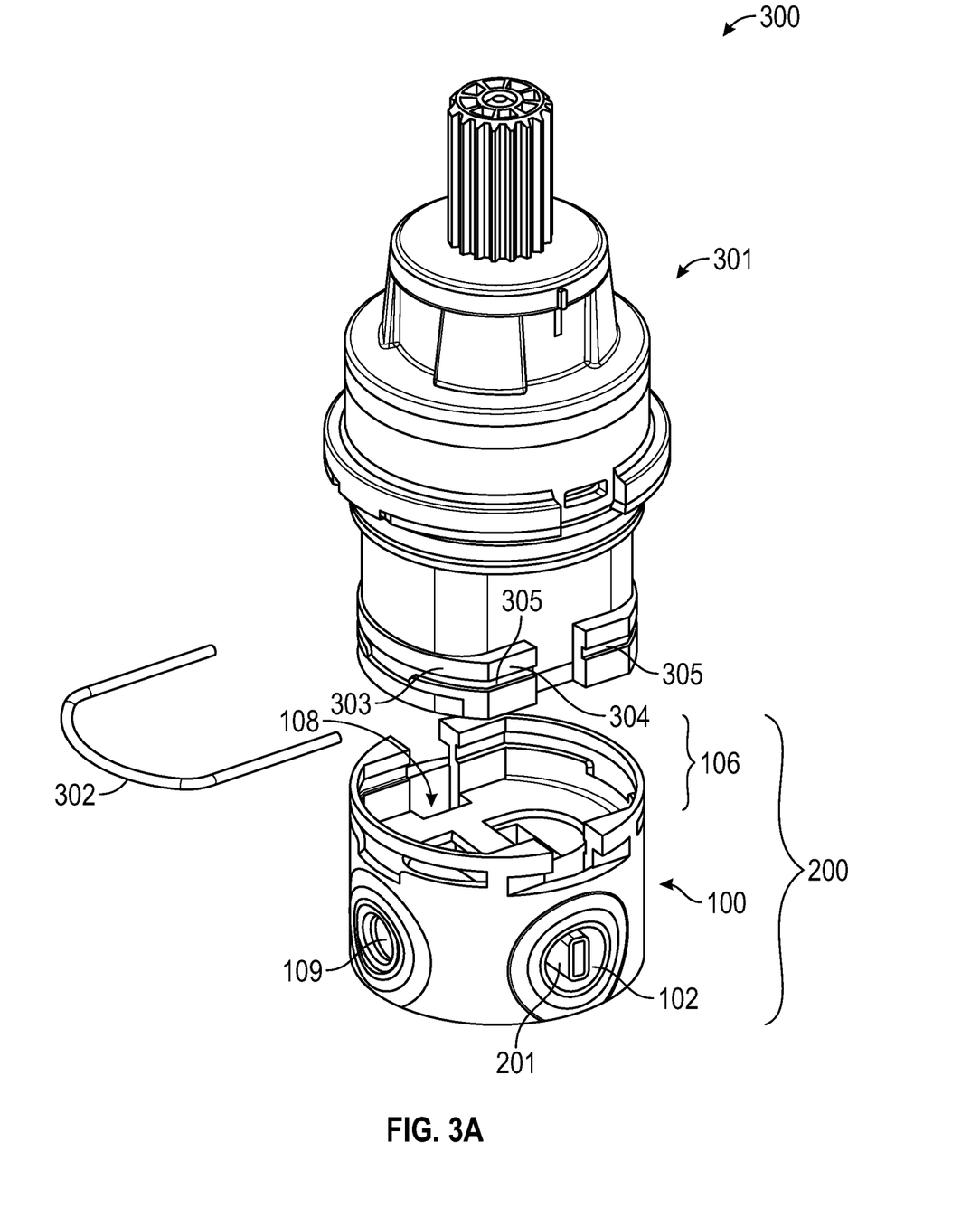
FIG. 3A displays a valve manifold, an attachment pin, and a fluid mixing valve, separated, according to an embodiment.

FIG. 3A shows assembly 300, comprising fluid mixing valve 301, attachment pin 302 and valve manifold/venturi assembly 200 separated, according to an embodiment. Fluid mixing valve 301 is configured to couple to and removably fit into manifold cavity 106. Visible is manifold transition 107 in flow communication with cavity 106 and manifold inlet 101 (not visible/opposite inlet 109). Visible also is manifold channel 108 in flow communication with cavity 106, first manifold outlet 102 and second manifold outlet 105 (not visible/opposite 102). Fluid mixing valve 301 comprises curved sections 303 and flat sections 304 in a base thereof configured to couple with corresponding curved and flat sections in manifold cavity 106. Fluid mixing valve 301 is configured to be coupled to manifold assembly 200 at rotation intervals of about 180 degrees. Grooves 305 in fluid mixing valve 301 base are configured to receive substantially U-shaped pin 302. This is an example of a pin/slot attachment element.

Figure 3B:
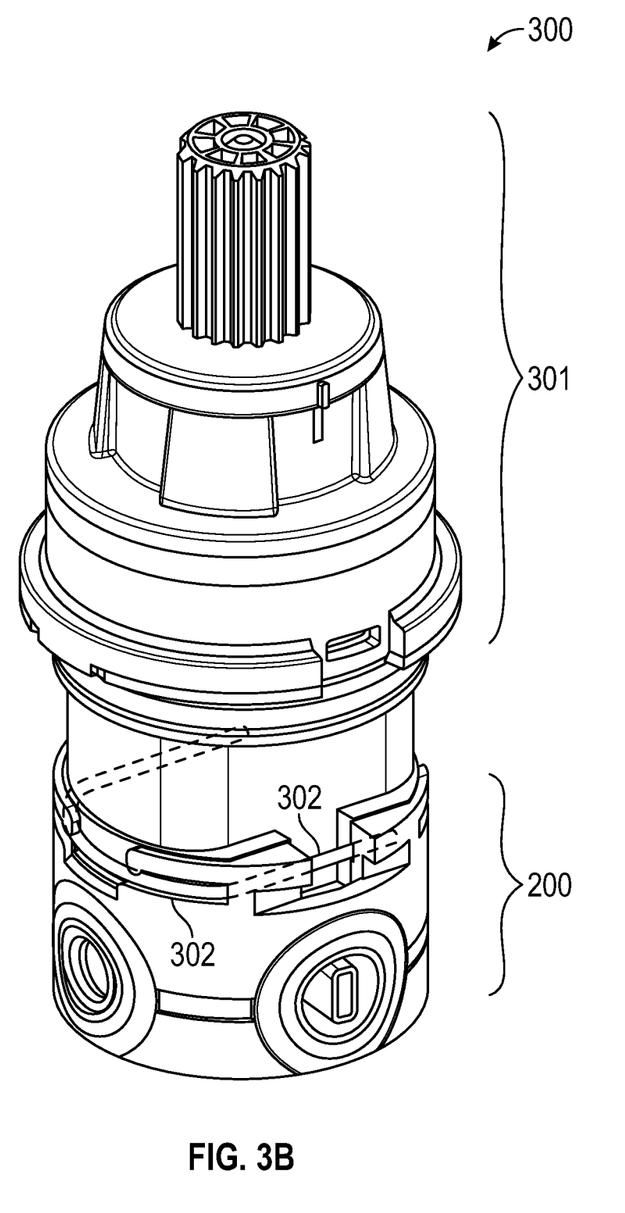
FIG. 3B shows a valve manifold and a fluid mixing valve coupled via an attachment pin, according to an embodiment.
Figure 3C:
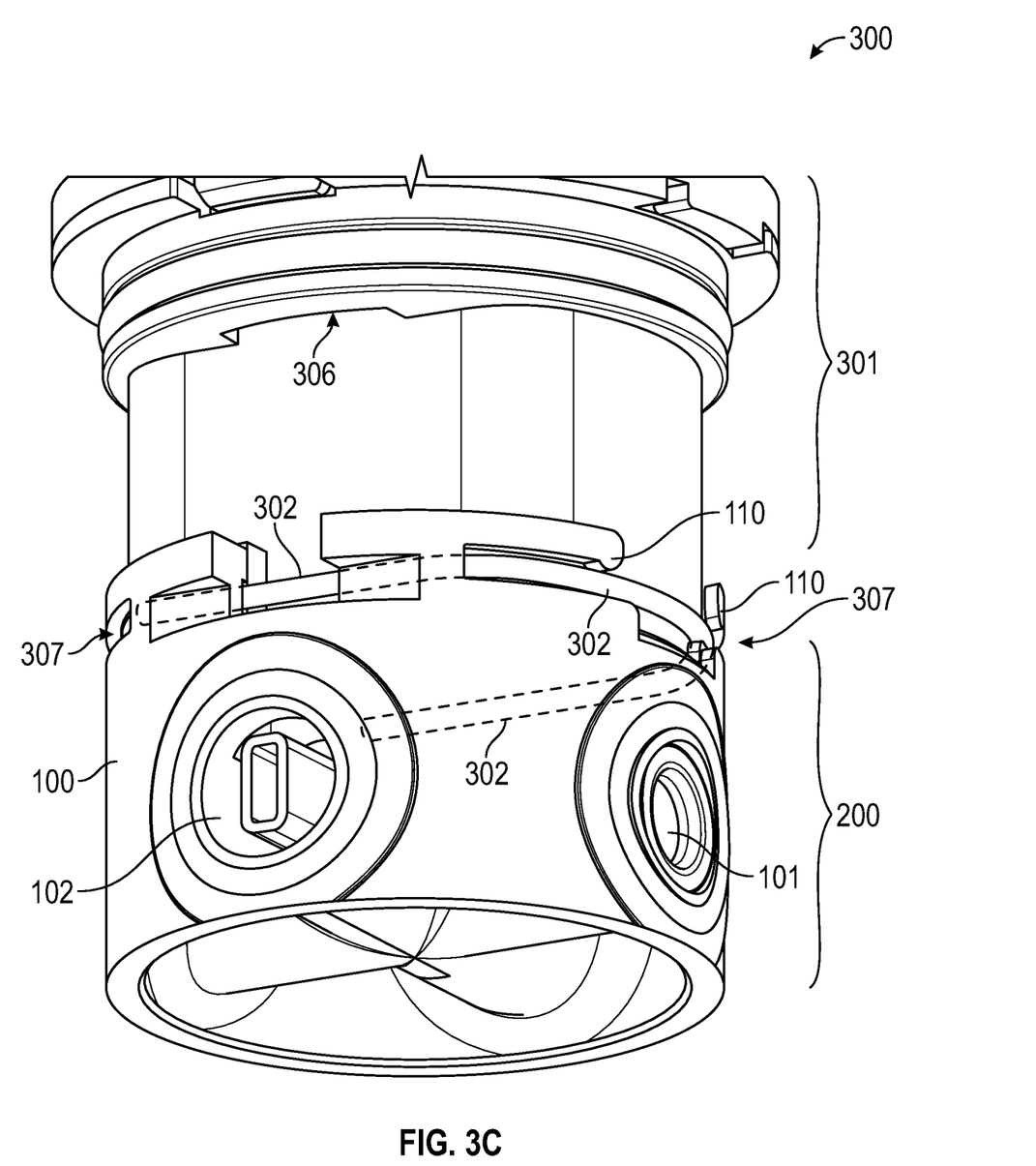
FIG. 3C shows a valve manifold and a fluid mixing valve coupled via an attachment pin, according to an embodiment.

FIG. 3B and FIG. 3C depict fluid mixing valve/manifold assembly 300, containing fluid mixing valve 301 coupled to manifold/venturi arrangement 200, according to an embodiment. Portions of substantially U-shaped attachment pin 302 are visible, while other portions are visible in a "see-through" view. Visible is fluid mixing valve outlet 306 which will align with a manifold channel (not visible) and be in flow communication with manifold outlet 102. Manifold 100 in this embodiment contains one or more slots 307 configured to allow for insertion/removal of pin 302. Manifold inlet 101 is visible which will be opposite manifold inlet 109 (not visible). Retainer features 110 are visible.

Figure 4:
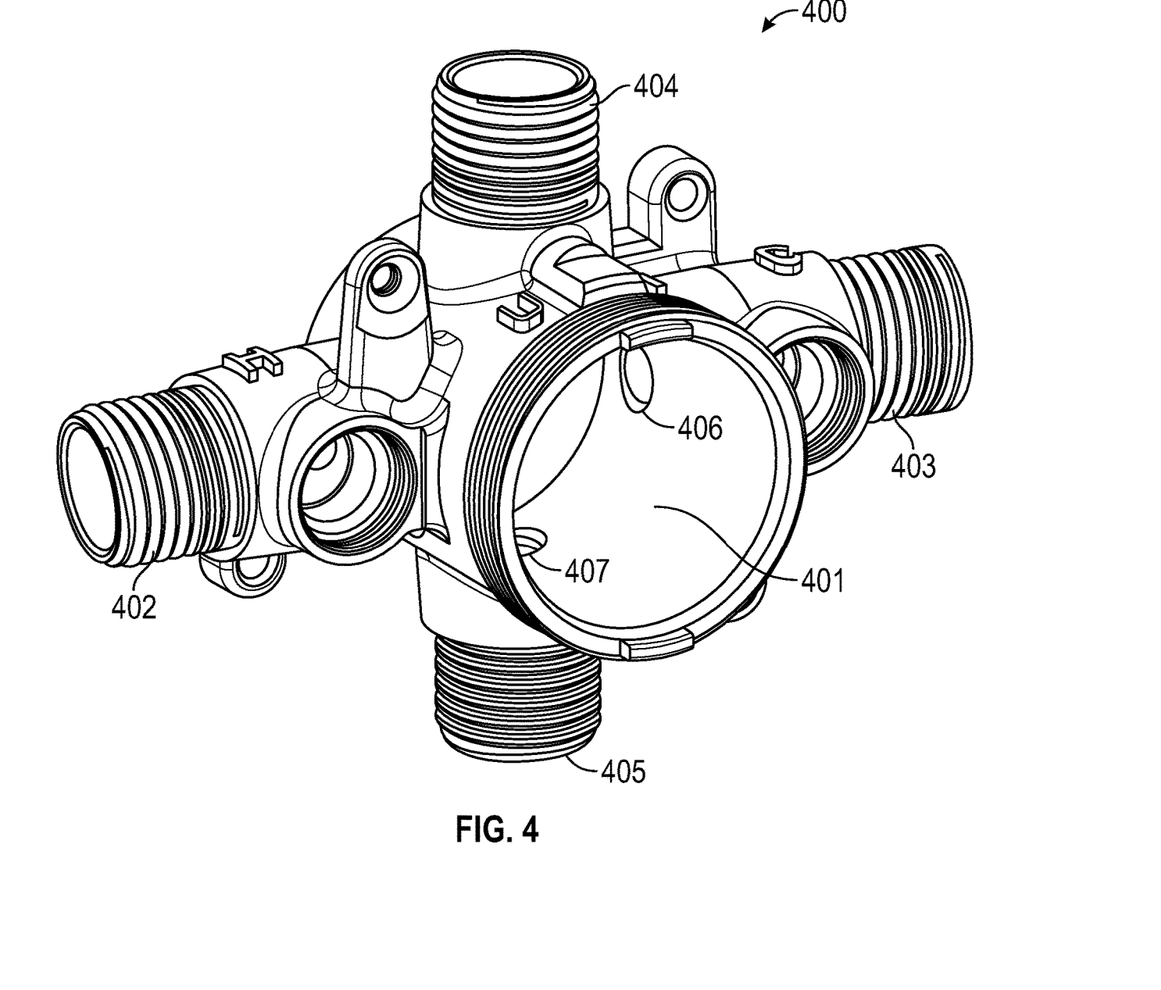
FIG. 4 displays a universal rough-in valve according to an embodiment.

FIG. 4 shows universal rough-in valve 400 according to an embodiment having valve chamber 401 configured to receive a valve manifold. Rough-in valve 400 comprises first inlet 402 and second inlet 403 configured to be in flow communication with a hot water source and a cold water source. Rough-in valve 400 comprises first outlet 404 configured to be in flow communication with a first outlet line, for instance a shower outlet line. Rough-in valve 400 comprises a second outlet 405 configured to be in flow communication with a second outlet line, for instance a tub outlet line. Visible is inlet passageway 406 and outlet passageway 407.

Figure 5:
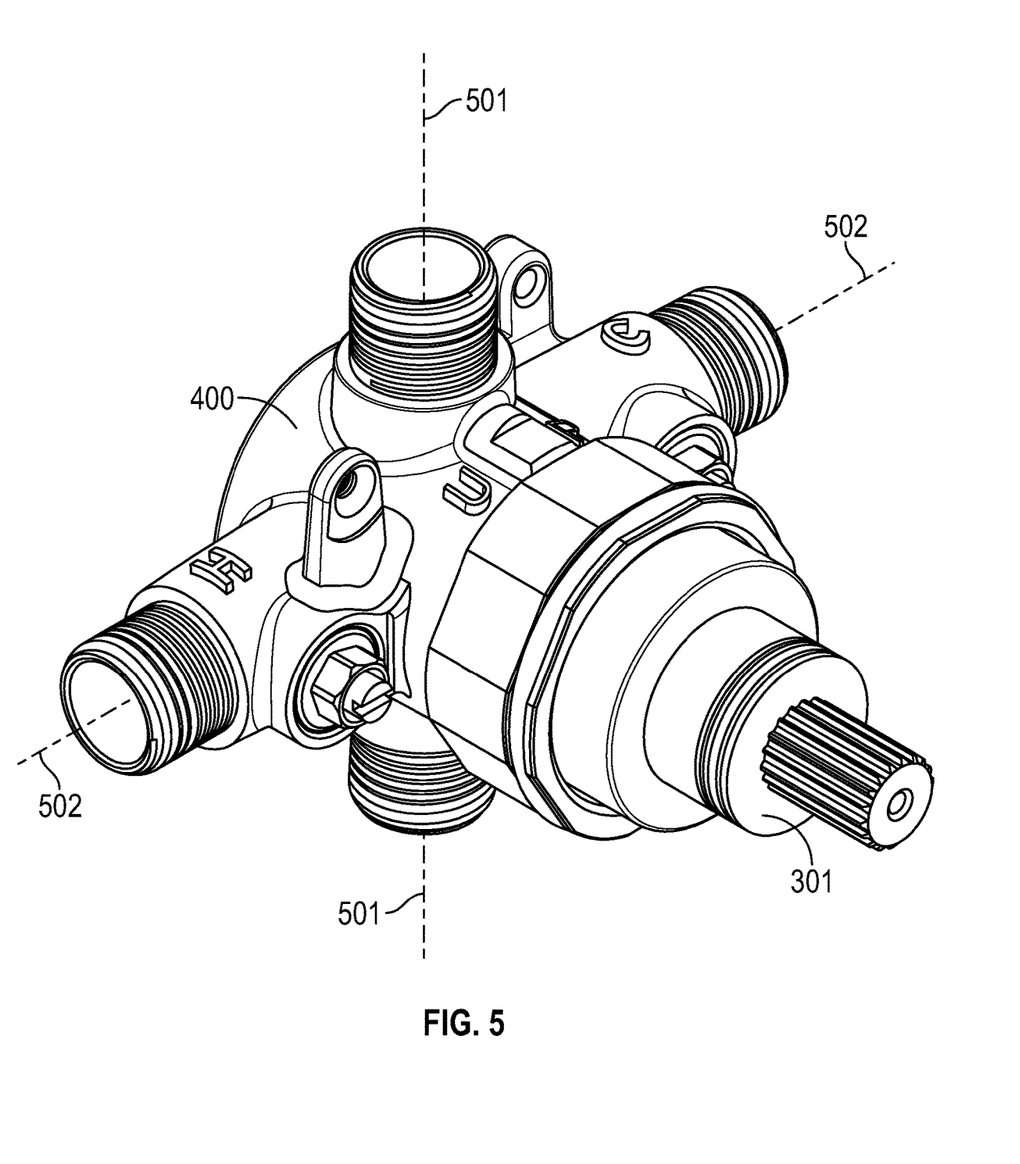
FIG. 5 depicts a universal rough-in valve assembly comprising a valve manifold and a fluid mixing valve, according to an embodiment.

FIG. 5 displays assembly 500 comprising a valve manifold disposed in the rough-in valve chamber (not visible) and a fluid mixing valve 301 disposed in a manifold cavity. Axis 501 is the Y axis and axis 502 is the X axis. Manifold outlet 102 (not visible) will be positioned "up" and manifold outlet 105 (not visible) will be pointing "down". To place another assembled universal rough-in valve 500 back-to-back with this one, rotation of the assembly around the Y axis 501 preserves the position of manifold outlets 102 and 105 and the venturi disposed therein. In order to have the fluid mixing valve oriented correctly to receive hot and cold water, the manifold/fluid mixing valve assembly 300 is removed from the rough-in valve. The fluid mixing valve is removed from the manifold, rotated about 180 degrees and placed back into the manifold and reassembled. The manifold/fluid mixing valve assembly 300 is then placed back into the rough-in valve. The back-to-back rough-in valve assemblies then may receive hot water from the same side and cold water from the same side.

Figure 6:
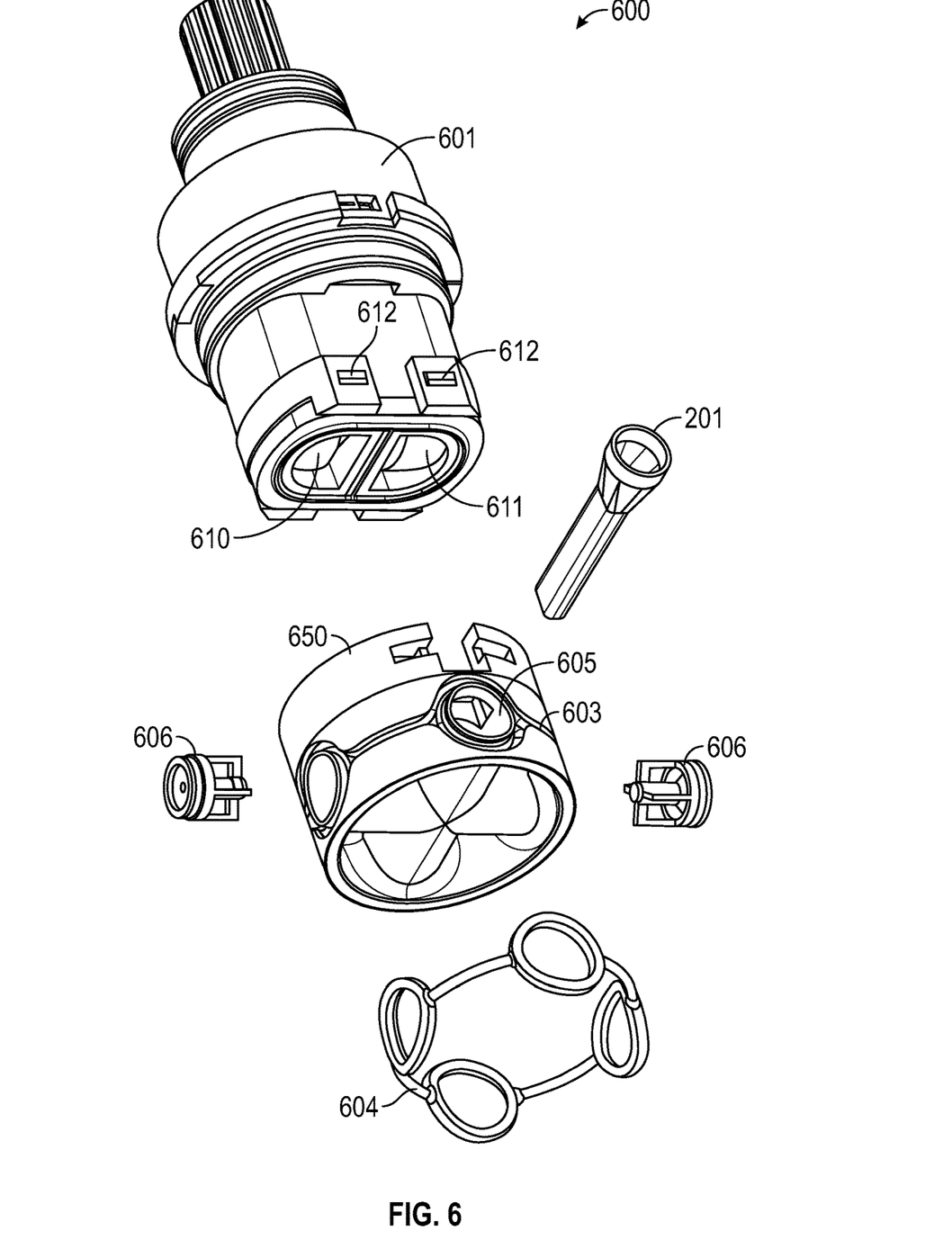
FIG. 6 shows an exploded view of a fluid mixing valve and a manifold, according to an embodiment.

FIG. 6 illustrates assembly 600 containing fluid mixing valve 601, manifold 650 and venturi 201, separated, according to another embodiment. Venturi 201 is positioned to enter manifold second outlet 605. Check valves 606 are positioned to be inserted into the manifold inlets. Gasket 604 is positioned to be mated with groove 603 on an exterior of manifold 650 and is configured to form a seal with an interior wall of a rough-in valve chamber. Fluid mixing valve 601 contains liquid valve entries 610 and 611. The fluid mixing valve contains notches 612 configured to couple to tabs positioned on an interior of the manifold.

Some rough-in valves are disclosed for example in U.S. app. No. PCT/US18/57014, filed Oct. 23, 2018, published as WO2019083942A1.

Following are some non-limiting embodiments of the disclosure.

In a first embodiment, disclosed is valve manifold for a universal rough-in valve, the manifold comprising a first manifold inlet; a second manifold inlet; a first manifold outlet; a second manifold outlet; a cavity configured to receive a fluid mixing valve; a first transition in flow communication with the cavity and the first manifold inlet; a second transition in flow communication with the cavity and the second manifold inlet; a first channel in flow communication with the cavity and the first manifold outlet; a second channel in flow communication with the cavity and the second manifold outlet; wherein the manifold comprises a venturi tube comprising a first section and a second section; the venturi tube first section has a larger cross-sectional area than the second section; the venturi tube first section is disposed in the second manifold outlet; and the venturi tube extends from the second manifold outlet towards the first manifold outlet; and wherein the manifold is configured to be removably disposed in a rough-in valve chamber; and the manifold is configured to be removably coupled to the fluid mixing valve.

In a second embodiment, disclosed is a valve manifold according to embodiment 1, wherein the first manifold outlet is a shower manifold outlet configured to be in flow communication with a shower head and the second manifold outlet is a tub manifold outlet configured to be in flow communication with a tub spout.

In a third embodiment, disclosed is a valve manifold according to embodiments 1 or 2, wherein the venturi tube is permanently fixed in the second manifold outlet. In a fourth embodiment, disclosed is a valve manifold according to any of the preceding embodiments, wherein the venturi tube comprises an attachment element configured to permanently fix it in the second manifold outlet.

In a fifth embodiment, disclosed is a valve manifold according to any of the preceding embodiments, wherein the first manifold inlet and/or the second manifold inlet comprise a check valve.

In a sixth embodiment, disclosed is a valve manifold according to any of the preceding embodiments, wherein the manifold is configured to be disposed in the rough-in valve chamber in a fixed position.

In a seventh embodiment, discloses is a valve manifold according to any of the preceding embodiments, wherein the first transition is transverse to the first manifold inlet and the second transition is transverse to the second manifold inlet.

In an eighth embodiment, disclosed is a valve manifold according to any of the preceding embodiments, wherein the manifold is configured to removably couple to the fluid mixing valve at about 180 degree rotation intervals of the fluid mixing valve relative to the manifold. In a ninth embodiment, disclosed is a valve manifold according to any of the preceding embodiments, wherein the manifold is configured to be removably coupled to the fluid mixing valve via an attachment element.

In a tenth embodiment, disclosed is a valve manifold according to any of the preceding embodiments, wherein the manifold is configured to be removably coupled to the fluid mixing valve via an attachment element, wherein the attachment element comprises one or more of a notch/tab element, a pin/slot element, a pin/hole element, or a threaded element. In an eleventh embodiment, disclosed is a valve manifold according to any of the preceding embodiments, wherein the manifold is configured to be removably coupled to the fluid mixing valve via a pin/slot attachment element, wherein the pin is substantially U-shaped. In a twelfth embodiment, disclosed is a valve manifold according to any of the preceding embodiments, wherein the manifold is configured to be removably coupled to the fluid mixing valve via an attachment element, and wherein the manifold comprises one or more retainer features configured to hold the attachment element in position.

In a thirteenth embodiment, disclosed is a valve manifold according to any of the preceding embodiments, wherein a) the first manifold inlet and the first transition are configured to be in flow communication with a first fluid mixing valve inlet and the second manifold inlet and the second transition are configured to be in flow communication with a second fluid mixing valve inlet; or b) the first manifold inlet and the first transition are configured to be in flow communication with the second fluid mixing valve inlet and the second manifold inlet and the second transition are configured to be in flow communication with the first fluid mixing valve inlet; and wherein a) and b) are selected based on about 180 degree rotation intervals of the fluid mixing valve relative to the manifold.

In a fourteenth embodiment, disclosed is a valve manifold according to any of the preceding embodiments, wherein a) the first manifold inlet and the first transition are configured to be in flow communication with a hot water source and the second manifold inlet the second transition are configured to be in flow communication with a cold water source; or b) the first manifold inlet and the first transition are configured to be in flow communication with a cold water source and the second manifold inlet the second transition are configured to be in flow communication with a hot water source; and wherein a) and b) are selected based on about 180 degree rotation intervals of the fluid mixing valve relative to the manifold.

In a fifteenth embodiment, disclosed is a valve manifold according to any of the preceding embodiments, wherein the manifold comprises a groove configured to receive a gasket, the gasket configured to form a seal with an internal wall of the rough-in valve chamber.

In a sixteenth embodiment, disclosed is a valve manifold according to any of the preceding embodiments, wherein an outer surface of the venturi tube first section forms a seal with an inner surface of the second manifold outlet.

In a seventeenth embodiment, disclosed is a valve manifold according to any of the preceding embodiments, wherein the manifold comprises an outlet passageway extending from the first manifold outlet to the second manifold outlet.

In an eighteenth embodiment, disclosed is a valve manifold according to any of the preceding embodiments, wherein the manifold cavity comprises a sidewall defining the cavity. In a nineteenth embodiment, disclosed is a valve manifold according to any of the preceding embodiments, wherein the manifold cavity comprises a sidewall defining the cavity, and wherein the first and second channels are at least partially defined by the sidewall.

In a twentieth embodiment, disclosed is a valve manifold according to any of the preceding embodiments, wherein the first and second transitions are positioned towards a center of the manifold and the first and second channels are positioned towards an outer section of the manifold.

In a twenty-first embodiment, disclosed is a valve manifold according to any of the preceding embodiments, wherein the manifold is substantially symmetrical about a plane bisecting the venturi tube. In a twenty-second embodiment, disclosed is a valve manifold according to any of the preceding embodiments, wherein the venturi tube first section comprises a substantially frustoconical shape. In a twenty-third embodiment, disclosed is a valve manifold according to any of the preceding embodiments, wherein the venturi tube second section comprises a substantially rectangular cross-section.

Following is another set of non-limiting embodiments of the disclosure.

In a first embodiment, disclosed is a universal rough-in valve comprising a valve chamber configured to receive a valve manifold; a first valve inlet configured to be in flow communication with a first fluid supply source; a second valve inlet configured to be in flow communication with a second fluid supply source; a first valve outlet configured to be in flow communication with the valve chamber and a first outlet line; a second valve outlet configured to be in flow communication with the valve chamber and a second outlet line; and the valve manifold according to any of the prior embodiments 1 to 23 removably disposed in the chamber.

In a second embodiment, disclosed is a universal rough-in valve according to the first embodiment, comprising a fluid mixing valve removably coupled to the valve manifold. In a third embodiment, disclosed is a universal rough-in valve according to embodiments 1 or 2, wherein the fluid mixing valve is a pressure balance valve or a thermostatic valve.

In a fourth embodiment, disclosed is a universal rough-in valve according to any of the preceding embodiments, wherein the first manifold inlet is in flow communication with the first valve inlet; the second manifold inlet is in flow communication with the second valve inlet; the first manifold outlet is in flow communication with the first valve outlet; and the second manifold outlet is in flow communication with the second valve outlet.

In a fifth embodiment, disclosed is a universal rough-in valve according to any of the preceding embodiments, wherein the first valve outlet is a shower valve outlet configured to be in flow communication with a shower head and the second valve outlet is a tub valve outlet configured to be in flow communication with a tub spout.

In a sixth embodiment, disclosed is a universal rough-in valve according to any of the preceding embodiments, wherein the valve manifold is configured to be removably disposed in the valve chamber in a fixed position.

In a seventh embodiment, disclosed is a universal rough-in valve according to any of the preceding embodiments, wherein a) the first valve inlet is configured to be in flow communication with a first fluid mixing valve inlet and the second valve inlet and is configured to be in flow communication with a second fluid mixing valve inlet; or b) the first valve inlet is configured to be in flow communication with the second fluid mixing valve inlet and the second valve inlet is configured to be in flow communication with the first fluid mixing valve inlet; and wherein a) and b) are selected based on about 180 degree rotation intervals of the fluid mixing valve relative to the manifold and the rough-in valve.

In an eighth embodiment, disclosed is a universal rough-in valve according to any of the preceding embodiments, wherein a) the first valve inlet is configured to be in flow communication with a hot water source and the second valve inlet is configured to be in flow communication with a cold water source; or b) the first valve inlet is configured to be in flow communication with a cold water source and the second valve inlet is configured to be in flow communication with a hot water source; and wherein a) and b) are selected based on about 180 degree rotation intervals of the fluid mixing valve relative to the manifold and the rough-in valve.

Following are more non-limiting embodiments of the disclosure.

In a first embodiment, disclosed is a fluid mixing valve comprising a mixing cartridge; a first fluid mixing valve inlet; a second fluid mixing valve inlet; a first fluid mixing valve outlet; and a second fluid mixing valve outlet; wherein the fluid mixing valve is configured to be removably coupled to the valve manifold according to any of the first set of embodiments at about 180 degree rotation intervals of the fluid mixing valve relative to the manifold.

In a second embodiment, disclosed is a fluid mixing valve according to embodiment 1, wherein a) the first fluid mixing valve outlet is configured to be in flow communication with a valve manifold first channel and the second fluid mixing valve outlet is configured to be in flow communication with a valve manifold second channel; or b) the first fluid mixing valve outlet is configured to be in flow communication with a valve manifold second channel and the second fluid mixing valve outlet is configured to be in flow communication with a valve manifold first channel; wherein a) and b) are selected based on about 180 degree rotation intervals of the fluid mixing valve relative to the manifold.

In a third embodiment, disclosed is a fluid mixing valve according to embodiments 1 or 2, wherein the mixing valve is configured to be removable coupled to the valve manifold via an attachment element.

In a fourth embodiment, disclosed is a fluid mixing valve according to any of the preceding embodiments, wherein the mixing valve is configured to be removable coupled to the valve manifold via a pin/slot attachment element, and wherein the mixing valve comprises a groove or grooves configured to receive a pin of the pin/slot attachment element.

In a fifth embodiment, disclosed is a fluid mixing valve according to any of the preceding embodiments, wherein the first fluid mixing valve inlet is configured to receive hot water and the second fluid mixing valve is configured to receive cold water. In a sixth embodiment, disclosed is a fluid mixing valve according to any of the preceding embodiments, wherein the fluid mixing valve comprises a limiter configured to determine a maximum percentage of hot water allowed to flow through the mixing cartridge.

The term "coupled" means that an element is "attached to" or "associated with" another element. "Coupled" may mean directly coupled or coupled through one or more other elements. An element may be coupled to an element through two or more other elements in a sequential manner or a non-sequential manner. The term "via" in reference to "via an element" may mean "through" or "by" an element. Coupled or "associated with" may also mean elements not directly or indirectly attached, but that they "go together" in that one may function together with the other.

The term "flow communication" means for example configured for liquid or gas flow there through. The terms "upstream" and "downstream" indicate a direction of gas or fluid flow, that is, gas or fluid will flow from upstream to downstream.

The term "towards" in reference to a of point of attachment, may mean at exactly that location or point or, alternatively, may mean closer to that point than to another distinct point, for example "towards a center" means closer to a center than to an edge. The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

Embodiments of the disclosure include any and all parts and/or portions of the embodiments, claims, description and figures. Embodiments of the disclosure also include any and all combinations and sub-combinations of embodiments.

All U.S. patent applications, published patent applications and patents referred to herein are hereby incorporated by reference.

The invention claimed is:

1. A valve manifold for a universal rough-in valve, the manifold comprising
a first manifold inlet; a second manifold inlet;
a first manifold outlet; a second manifold outlet;
a cavity configured to receive a fluid mixing valve;
a first transition in flow communication with the cavity and the first manifold inlet;
a second transition in flow communication with the cavity and the second manifold inlet;
a first channel in flow communication with the cavity and the first manifold outlet;
a second channel in flow communication with the cavity and the second manifold outlet;
wherein
the manifold comprises a venturi tube comprising a first section and a second section;
the venturi tube first section has a larger cross-sectional area than the second section;
the venturi tube first section is disposed in the second manifold outlet;
the venturi tube is permanently fixed in the second manifold outlet; and
the venturi tube extends from the second manifold outlet towards the first manifold outlet; and
wherein
the manifold is configured to be removably disposed in a rough-in valve chamber; and
the manifold is configured to be removably coupled to the fluid mixing valve.

2. The valve manifold according to claim 1, wherein the first manifold outlet is a shower manifold outlet configured to be in flow communication with a shower head and the second manifold outlet is a tub manifold outlet configured to be in flow communication with a tub spout.

3. The valve manifold according to claim 1, wherein the venturi tube comprises an attachment element to permanently fix it in the second manifold outlet.

4. The valve manifold according to claim 1, wherein an outer surface of the venturi tube first section forms a seal with an inner surface of the second manifold outlet.

5. The valve manifold according claim 1, wherein the venturi tube first section comprises a frustoconical shape and the second section comprises a rectangular cross-section.

6. The valve manifold according to claim 1, wherein the manifold is configured to be disposed in the rough-in valve chamber in a fixed position.

7. The valve manifold according to claim 1, wherein the manifold is symmetrical about a plane bisecting the venturi tube.

8. The valve manifold according to claim 1, wherein the manifold comprises a groove configured to receive a gasket, the gasket configured to form a seal with an internal wall of the rough-in valve chamber.

9. The valve manifold according to claim 1, wherein the manifold is configured to removably couple to the fluid mixing valve at 180 degree rotation intervals of the fluid mixing valve relative to the manifold.

10. The valve manifold according to claim 1, wherein the manifold is configured to be removably coupled to the fluid mixing valve via an attachment element.

11. The valve manifold according to claim 1, wherein the manifold is configured to be removably coupled to the fluid mixing valve via an attachment element, wherein the attachment element comprises one or more of a notch/tab element, a pin/slot element, a pin/hole element, or a threaded element.

12. The valve manifold according to claim 1, wherein the manifold is configured to be removably coupled to the fluid mixing valve via a pin/slot attachment element, wherein the pin is U-shaped.

13. The valve manifold according to claim 1, wherein the manifold is configured to be removably coupled to the fluid mixing valve via an attachment element, and wherein the manifold comprises one or more retainer features configured to hold the attachment element in position.

14. The valve manifold according to claim 1, wherein
a) the first manifold inlet and the first transition are configured to be in flow communication with a first fluid mixing valve inlet and the second manifold inlet and the second transition are configured to be in flow communication with a second fluid mixing valve inlet; or
b) the first manifold inlet and the first transition are configured to be in flow communication with the second fluid mixing valve inlet and the second manifold inlet and the second transition are configured to be in flow communication with the first fluid mixing valve inlet; and
wherein a) and b) are selected based on about 180 degree rotation intervals of the fluid mixing valve relative to the manifold.

15. The valve manifold according to claim 1, wherein
a) the first manifold inlet and the first transition are configured to be in flow communication with a hot water source and the second manifold inlet the second transition are configured to be in flow communication with a cold water source; or
b) the first manifold inlet and the first transition are configured to be in flow communication with a cold water source and the second manifold inlet the second transition are configured to be in flow communication with a hot water source; and
wherein a) and b) are selected based on about 180 degree rotation intervals of the fluid mixing valve relative to the manifold.

16. The valve manifold according to claim 1, wherein the manifold comprises an outlet passageway extending from the first manifold outlet to the second manifold outlet.

17. The valve manifold according to claim 1, wherein the manifold cavity comprises a sidewall defining the cavity, and wherein the first and second channels are at least partially defined by the sidewall.

18. The valve manifold according to claim 1, wherein the first and second transitions are positioned towards a center of the manifold and the first and second channels are positioned towards an outer section of the manifold.

19. A universal rough-in valve comprising
a valve chamber configured to receive a valve manifold;
a first valve inlet configured to be in flow communication with a first fluid supply source;
a second valve inlet configured to be in flow communication with a second fluid supply source;
a first valve outlet configured to be in flow communication with the valve chamber and a first outlet line;
a second valve outlet configured to be in flow communication with the valve chamber and a second outlet line; and
the valve manifold according to claim 1 removably disposed in the chamber.

20. A fluid mixing valve comprising
a mixing cartridge;
a first fluid mixing valve inlet;
a second fluid mixing valve inlet;
a first fluid mixing valve outlet; and
a second fluid mixing valve outlet;
wherein
the fluid mixing valve is configured to be removably coupled to the valve manifold according to claim 1 at 180 degree rotation intervals of the fluid mixing valve relative to the manifold.

* * * * *